Figure 1:
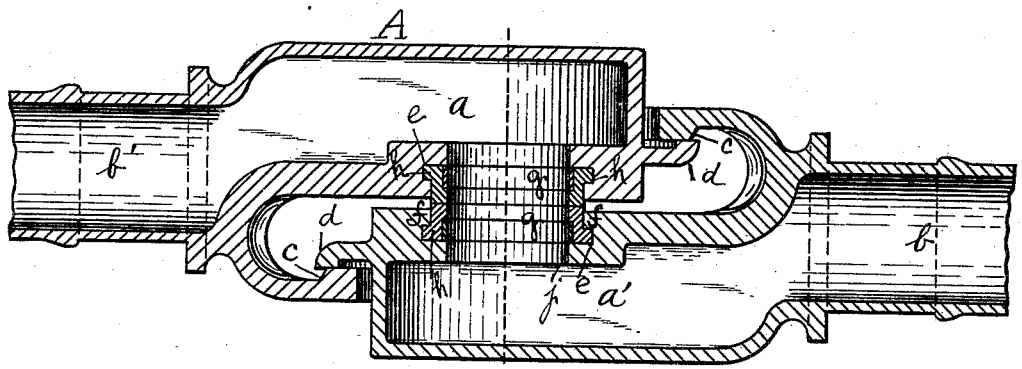

(No Model.)

F. J. McGUIRE.
PIPE COUPLING.

No. 449,293. Patented Mar. 31, 1891.

Witnesses:
J. N. Cooke.
Rob: D. Totten

Inventor
Frank J. McGuire
By James J. Kay
Attorney

UNITED STATES PATENT OFFICE.

FRANK J. McGUIRE, OF ALLEGHENY, PENNSYLVANIA.

PIPE-COUPLING.

SPECIFICATION forming part of Letters Patent No. 449,293, dated March 31, 1891.

Application filed August 7, 1890. Serial No. 361,321. (No model.)

*To all whom it may concern:*

Be it known that I, FRANK J. MCGUIRE, a resident of Allegheny city, in the county of Allegheny and State of Pennsylvania, have invented a new and useful Improvement in Power-Brake Valves; and I do hereby declare the following to be a full, clear, and exact description thereof.

My invention relates to pipe or hose couplings, and more especially to a coupling adapted to be employed in a system of brakes in which air or other fluid is used to operate the brakes, the couplings being secured to the ends of the hose connections of each car, whereby on joining these couplings the cars of the train are all connected, forming a complete system of distribution of the air from the engine to the rear car. It is very apparent that for the successful operation of such a system of air-brakes it is most essential that the connection between the several cars be perfectly air-tight, any leakage detracting from the efficiency of the brakes.

One of the most approved forms of brake-couplings heretofore employed is composed of two parts, sections, or half-couplings, each half-coupling consisting of a box with openings formed in both sides thereof, the opening in the outer face being closed by a cap screwed therein. Upon the interlocking of the half-couplings by a lateral movement of the two inner faces over each other the openings on the inner faces of said half-couplings are brought into coincidence with each other, thereby forming direct communication between the two half-couplings. To insure a tight joint, the inner openings are provided with rubber washers forced into close contact with each other by the interlocking connection. In order to retain these washers securely in place and prevent their withdrawal during the severe torsional strain exerted in interlocking the half-couplings, a skeleton frame is inserted in the outer opening of each half-coupling adapted to press tightly against the washers. To retain the skeleton frame in contact with the washers, a cap is screwed in the opening in the outer face, pressing against the skeleton frame and holding the frame rigidly in contact with the washer. This form of coupling necessitates the forming of each half-coupling with two openings therein, the outer opening being provided with a threaded connection for the engagement of the cap after the skeleton frame has been inserted therein. Such additional parts increase the cost of the coupling, while at the same time a half-coupling with a cap closing one side thereof presents an additional source of leakage.

Pipe-couplings have been formed with closed back faces; but the difficulty has been to secure the washers in such a manner as to obtain a very tight joint.

The object of my invention, therefore, is to provide a coupling which can be manufactured at low cost and one in which the leakage is reduced to a minimum.

To these ends my invention consists, generally stated, in a pipe-coupling formed of two halves or sections, each half-coupling having an opening formed in the inner face thereof adapted to coincide with each other upon the interlocking of the halves, said half-couplings having solid outside faces opposite said openings and having rubber or like packing-rings having flanges thereon fitting in annular recesses formed within said sections and rings of copper or other expansible metal engaging with the interior faces of said washers to secure them in place.

It further consists in certain means for securing the rubber or like packing-rings within the openings, all of which will be more fully hereinafter set forth and claimed.

To enable others skilled in the art to make and use my invention, I will describe the same more fully, referring to the accompanying drawings, in which—

Figure 2:
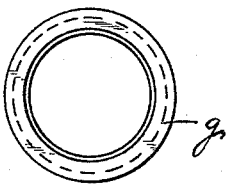
Figure 3:
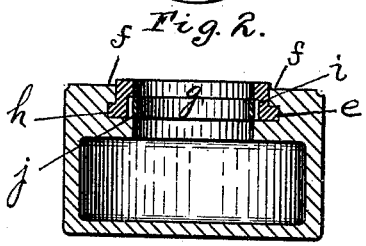

Figure 1 is a longitudinal section of a coupling constructed in accordance with my invention. Fig. 2 is a cross-section on the line 2 2, Fig. 1; and Fig. 3 is a view of the rubber or like packing-ring.

Like letters indicate like parts.

In the drawings, A represents a pipe-coupling, said coupling being composed of two halves or sections $a\ a'$, the body thereof being formed of brass or other suitable metal, and each of said half-couplings being provided with the connection $b$, whereby it is joined to the pipe or hose secured to each end of the car. The half-couplings $a\ a'$ are formed with the openings $a^2\ a^3$ in the inner faces thereof, while the outer faces $a^4$ of said half-couplings are cast solid with no openings of any kind.

Fig. 1 of the drawings shows the two halves $a$ $a'$ connected to form a passage between the connections $b$ and so opening communication between the pipe or hose secured to one car and that of the adjoining car. The locking device for connecting the half-couplings $a$ $a'$ is that generally employed, the flange $c$ of one half engaging with the projecting lip $d$ of the other, the connection being made by bringing the inner faces of said half-couplings in contact with each other, when by a lateral twist the two halves are interlocked in the manner shown. When the halves are interlocked, the openings $a^2$ $a^3$ exactly coincide. The halves $a$ $a'$ are each formed with the annular recess $e$ therein, said recess serving to form the projecting lip $f$. Fitting within the annular recess $e$ is the rubber or like packing-ring $g$, having the flange $h$ thereon fitting snugly within the said annular recess. The rubber washer $g$ is formed with a slight annular depression $i$ on its interior face at a point thereon corresponding to the exterior flange $h$ of said washer. A ring $j$, of copper or other expansible metal, engages with the annular depression $i$, so that upon inserting said ring within the said depression it may be expanded in any suitable manner, so as to press tightly against the interior face of the washer, and consequently force the flange $h$ farther into the recess $e$. The ring $j$, of expansible metal, being in direct line with the flange $c$, will compress the rubber, and in connection with the projecting lip $f$ will hold the washer $g$ securely in place, the elasticity of the rubber increasing the security of the hold. The washers $g$ extend slightly beyond the adjoining faces of the halves composing the coupling, so that when interlocked to form the complete coupling A, as shown in Fig. 1, with the coincidence of the openings $a^2$ $a^3$, the washers $g$ will also coincide, the connection being of such a nature as to force the washers into close contact with each other to prevent the leakage of the air, while at the same time the washers are so securely held in place that there is no liability of their being displaced either in making the connection or breaking the same. It is apparent that the lateral twist given to the halves in forming the coupling necessitates that the washers be so held as to be able to withstand the torsional strain on them.

In my improved coupling I am enabled to dispense with the additional opening in the outer face of each half-coupling, together with the skeleton frame to retain the packing-ring in place, thereby decreasing the liability of leakage as well as the cost of the coupling.

What I claim as my invention, and desire to secure by Letters Patent, is—

1. A pipe-coupling formed of two parts or sections, having side openings therein adapted to coincide with each other, said sections having solid back portions opposite said openings, rubber washers having flanges thereon fitting in annular recesses formed within said sections, and rings of copper or other expansible metal engaging with the interior faces of said washers, substantially as and for the purposes set forth.

2. A pipe-coupling having an annular recess formed therein, a rubber washer having a flange thereon, said flange adapted to fit within said annular recess, and a ring of copper or other expansible metal engaging with an annular depression formed on the interior face of the washer, substantially as and for the purposes set forth.

In testimony whereof I, the said FRANK J. McGUIRE, have hereunto set my hand.

FRANK J. McGUIRE.

Witnesses:
H. L. GOEHRING,
ROBT. D. TOTTEN.